United States Patent
Abel et al.

(10) Patent No.: US 7,486,687 B2
(45) Date of Patent: Feb. 3, 2009

(54) METHOD AND ALLOCATION DEVICE FOR ALLOCATING PENDING REQUESTS FOR DATA PACKET TRANSMISSION AT A NUMBER OF INPUTS TO A NUMBER OF OUTPUTS OF A PACKET SWITCHING DEVICE IN SUCCESSIVE TIME SLOTS

(75) Inventors: Francois Abel, Rueschlikon (CH); Ilias Iliadis, Rueschlikon (CH); Cyriel J. A. Minkenberg, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 10/789,234

(22) Filed: Feb. 27, 2004

(65) Prior Publication Data

US 2005/0190795 A1    Sep. 1, 2005

(51) Int. Cl.
*H04L 12/56* (2006.01)
(52) U.S. Cl. ...................................... 370/412
(58) Field of Classification Search ............... 370/395.4
See application file for complete search history.

(56) References Cited

U.S. PATENT DOCUMENTS

| | | | | |
|---|---|---|---|---|
| 5,500,858 A | * | 3/1996 | McKeown | 370/412 |
| 6,212,182 B1 | * | 4/2001 | McKeown | 370/390 |
| 6,856,622 B1 | * | 2/2005 | Calamvokis et al. | 370/390 |
| 6,977,935 B2 | * | 12/2005 | Kamiya et al. | 370/395.4 |
| 7,274,701 B2 | * | 9/2007 | Boduch et al. | 370/395.4 |
| 2002/0080796 A1 | * | 6/2002 | Matsuoka et al. | 370/395.4 |
| 2003/0231588 A1 | * | 12/2003 | Roth et al. | 370/230 |
| 2004/0071144 A1 | * | 4/2004 | Beeri et al. | 370/395.4 |
| 2004/0120321 A1 | * | 6/2004 | Han et al. | 370/395.4 |

* cited by examiner

*Primary Examiner*—Edan Orgad
*Assistant Examiner*—Timothy J Weidner
(74) *Attorney, Agent, or Firm*—F. Chau & Associates, LLC

(57) ABSTRACT

A method for allocating pending requests for data packet transmission at a number of inputs to a number of outputs of a switching system in successive time slots, including a matching method including the steps of providing a first request information in a first time slot indicating data packets at the inputs requesting transmission to the outputs of the switching system, performing a first step in the first time slot depending on the first request information to obtain a first matching information, providing a last request information in a last time slot successive to the first time slot, performing a last step in the last time slot depending on the last request information and depending on the first matching information to obtain a final matching information, and assigning the pending data packets at the number of inputs to the number of outputs based on the final matching information.

19 Claims, 7 Drawing Sheets

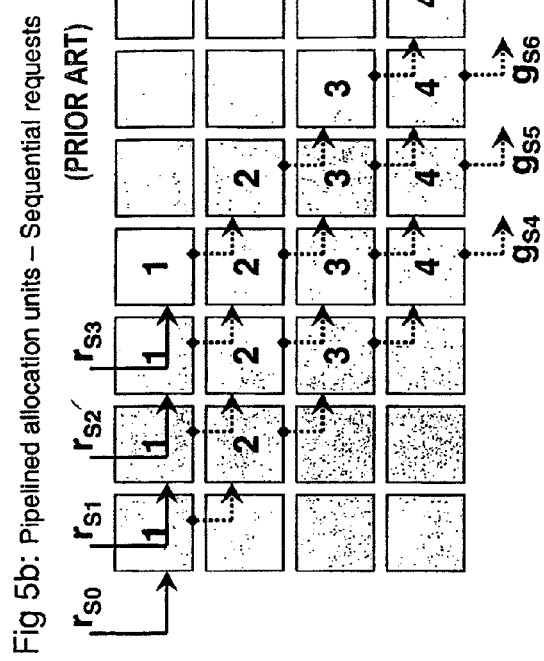
Fig 5b: Pipelined allocation units – Sequential requests (PRIOR ART)
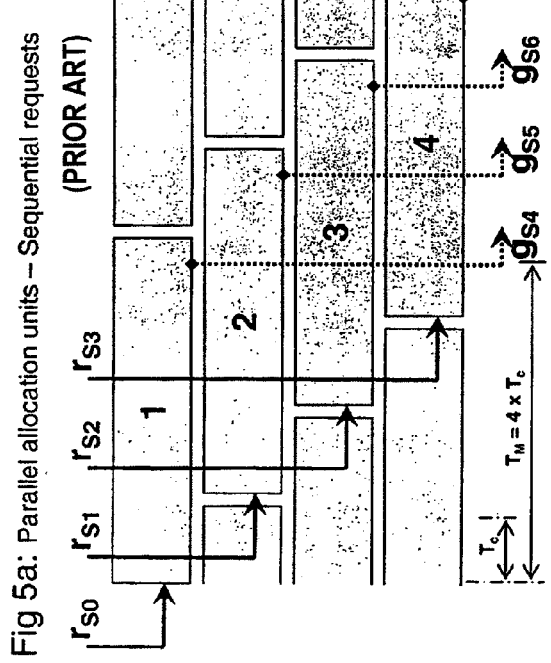
Fig 5a: Parallel allocation units – Sequential requests (PRIOR ART)
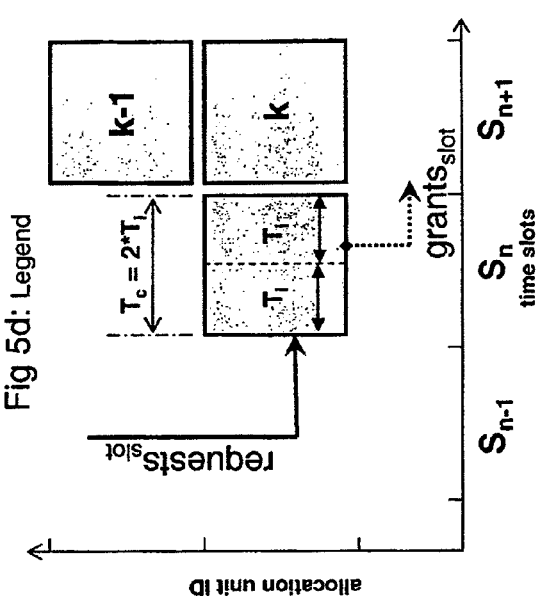
Fig 5d: Legend
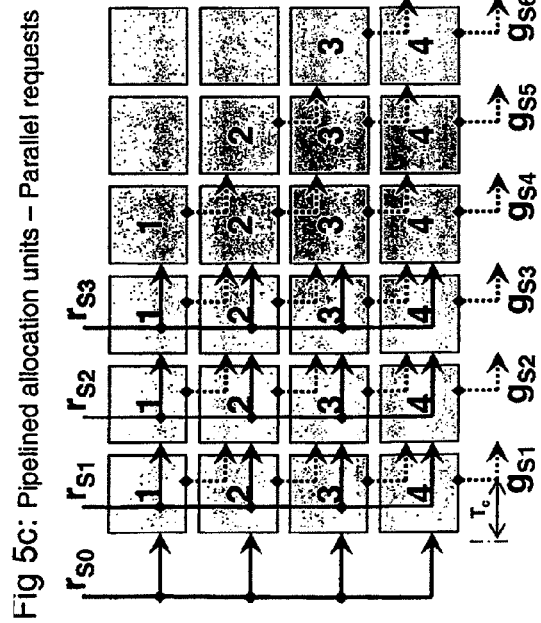
Fig 5c: Pipelined allocation units – Parallel requests

US 7,486,687 B2

METHOD AND ALLOCATION DEVICE FOR ALLOCATING PENDING REQUESTS FOR DATA PACKET TRANSMISSION AT A NUMBER OF INPUTS TO A NUMBER OF OUTPUTS OF A PACKET SWITCHING DEVICE IN SUCCESSIVE TIME SLOTS

FEDERALLY SPONSORED RESEARCH AND DEVELOPMENT

This invention was made with Government support under Contract No.: B527064 awarded by the Department of Energy. The Government has certain rights in this invention.

FIELD OF THE INVENTION

The present invention relates to the field of packet switching, specifically to the field of crossbar-based packet-switch architectures.

BACKGROUND OF THE INVENTION

Many packet switching devices are based on an input-queued architecture, comprising queues sorted per output (virtual output queues—VOQ) at every input line card, a crossbar routing fabric, and a central arbitration unit that computes which input is allowed to send to which output in every time slot. A time slot as herein understood equals the duration of one fixed size packet.

Typically, the arbitration unit is physically located close to the crossbar. In such a system, a data path is provided which comprises the flow of data packets from input line cards through the crossbar to the output line cards, and a control path, which comprises the flow of control information from the line cards to the arbiter, i.e. the request information, and back to the line cards, i.e. the grant information.

To obtain good performance, the arbitration unit should compute a matching between the inputs and outputs in every successive time slot, wherein a set of data packets from the inputs is forwarded to the respective outputs. An optimum solution for the matching is too complex to be implemented in fast hardware. Instead, heuristic iterative algorithms such as PIM, i-SLIP or DRRM are commonly used. The quality of their matching solution strongly depends on the number of iterations or steps that can be carried out in the available arbitration time, commonly in one time slot. In general, O(log (N)) iterations or steps are required for adequate performance, although in the worst case these algorithms only converge in N iterations, where N is the number of ports.

As line rates continue to increase but cell sizes remain constant, the available arbitration time is shrinking, making it harder to complete enough iterations or steps to achieve an optimized matching solution. The arbitration in general requires a number of iterations (depending on the number of ports N) that may not be feasible to complete during one time slot.

One solution to this problem is to parallelize or load balance the matching process over multiple allocation units, as proposed by Oki et al. "Pipelined-based approach for maximal size matching scheduling in input-buffered switches", IEEE Communication Letters, Vol. 5, No. 6, June 2001, pp. 363-365. To obtain one arbitration decision at every cell cycle, a number of identical parallel subschedulers are employed, each of them performing several iterations to perform the matching. One drawback of this solution is that the subschedulers in any case need a predetermined time until all iterations are performed before returning a matching result even if the matching was produced in the first iteration. This produces a latency which is determined by the predetermined number of time slots used for the iteration which cannot be reduced any further.

Another solution to the same problem is to pipeline the matching process as proposed by Nabeshima "Input-Queued Switches Using two Schedulers in Parallel", IEICE Transactions on Communication, Vol. E85-B, No. 2, February 2002, pp. 523-531. To obtain one arbitration decision in every time slot, the matching process is overlapped over multiple subschedulers arranged in a sequential pipeline setup, each of them performing one or more iterations to perform optimize the matching. The main drawback of this scheme is again the minimum latency which equals the sum of latencies of all the subschedulers.

It is therefore an object of the present invention to provide a method and an allocation device for allocating pending requests for the transmission of data packets at a number of inputs to a number of outputs of a packet switching device according to their destination, wherein the latency of the arbitration is minimized.

It is a further object of the present invention to provide a high throughput close or equal to the maximum achievable throughput and lower latency at low utilization relative to the existing schemes.

It is another object of the present invention to provide a method which may be combined with any of the known matching algorithms commonly used.

SUMMARY OF THE INVENTION

According to a first aspect of the present invention a method for allocating pending requests for data packet transmission at a number of inputs to a number of outputs of a packet switching device in successive time slots is provided. According to a matching method the allocation of the pending requests is optimized, wherein the matching method includes a number of steps for incrementally allocating the requests. As a result of each step matching information is provided. In each time slot request information is provided, the request information indicating the data packets at the inputs requesting transmission to respective outputs. A first request information is provided in a first time slot and a first step of the matching method is performed in the first time slot depending on the first request information to obtain a first matching information. A last request information is provided in a last time slot succeeding the first time slot and a last step is performed in the last time slot depending on the last request information and depending on the first matching information to receive a final matching information. The pending data packets are assigned at the number of inputs to the number of outputs in dependence on the final matching information.

It can be provided that the matching method is performed in a first and a second thread, which are shifted, so that the first step of the second thread and the second step of the first thread are performed in the same time slot. Thus, different threads of the matching method are performed in each of the time slots in parallel to generate the respective final matching information in every time slot.

According to one embodiment of the present invention between the first step and the last step of the matching method a number of intermediate steps are performed in successive intermediate time slots between the first time slot and the last time slot. Respective intermediate request information is provided in the respective intermediate time slot, wherein each of the steps provides intermediate matching information to a successive intermediate step depending on intermediate matching information from the preceding intermediate step and depending on request information of the respective intermediate time slot. The first step provides the first matching information to the first of the intermediate steps, and the last step receives the intermediate matching information from the last of the intermediate steps.

According to another embodiment, at least one of the intermediate steps or the last step is performed by modifying the respective intermediate or last request information depending on the respective first or intermediate matching information provided by the preceding step, wherein performing the one step depends on the modified respective request information to obtain a partial matching information.

According to another embodiment the one step of the matching method includes the merging of the intermediate or first matching information provided by the preceding step and the partial matching information from the current step to obtain the respective intermediate or final matching information.

According to another embodiment, the partial matching information is modified depending on the matching information provided by any of the steps, the partial matching information of any of the steps, the pending request information, and/or position information indicating the position of the respective step within the steps of the matching method.

According to another embodiment, each of the first, intermediate and last request information depends on the number of pending requests at each of the inputs with respect to each of the outputs.

According to another embodiment, the request information is selectively provided to the first, intermediate and last steps depending on the matching information provided by any of the steps of the matching method, the current number of pending requests of each input relative to each of the outputs, and/or a position information indicating the position of the respective step within the steps of the matching method.

According to another aspect of the present invention an allocation device for allocating pending requests for data packet transmission at a number of inputs to a number of outputs of a packet switching device in successive time slots is provided. The allocating of the pending requests is performed or optimized by a matching method, wherein the matching method includes a number of steps for incrementally allocating the requests to optimize the allocation of the data packets. It provides a first allocation stage for performing a first step of the matching method in a first time slot depending on first request information provided in the first time slot to receive first matching information. It is further provided a last allocation stage for performing a last step of the matching method in a last time slot depending on last request information provided in the last time slot and depending on the first matching information to receive final matching information. The respective provided request information indicates the data packets at the inputs requesting transmission to the respective outputs. By means of an allocation unit the pending data packets at the number of inputs to the number of outputs is allocated depending on the final matching information.

According to one embodiment, the allocation device further comprises one or more intermediate allocation stages which are located between the first allocation stage and the last allocation stage and are connected in series with each other and with the first and the last allocation stage, and for performing a number of intermediate steps of the matching method in successive intermediate time slots between the first time slot and the last time slot. Each of the allocation stages provides intermediate matching information to a successive intermediate allocation stage, wherein the intermediate matching information depending on intermediate matching information received from the preceding intermediate allocation stage and depending on provided intermediate request information of the respective intermediate time slot. The first allocation stage provides the first matching information to the first of the intermediate allocation stages, and the last allocation stage receives the intermediate matching information from the last of the intermediate allocation stages.

According to another embodiment of the present invention, at least one of the allocation stages comprises a prefilter for modifying the respective intermediate and last request information depending on the respective first and intermediate matching information provided by the preceding allocation stage. The one allocation stage further comprises an allocator for performing the step of the matching method of the respective allocation stage depending on the filtered respective request information to obtain partial matching information.

According to another embodiment of the present invention, the one allocation stage further comprises a merging unit for merging the first or intermediate matching information provided by the preceding allocation stage and the partial matching information to obtain the respective intermediate or final matching information.

According to another embodiment of the present invention, at least one of the allocation stages further comprises a postfilter unit for modifying the partial matching information depending on the matching information provided by any of the allocation stages, the partial matching information of any of the allocation stages, the pending request information in the respective time slot, and/or a position information indicating the position of the respective allocation stage within the series of allocation stages.

According to another embodiment of the present invention, the allocation device further comprises a request counter unit to provide the first, intermediate and last request information depending on the number of pending requests at each of the inputs with respect to each of the outputs in the respective first, intermediate and last time slot.

According to another embodiment of the present invention, the allocation device further comprises a selection unit to selectively provide the request information to the first, intermediate and last allocation stage depending on the matching information obtained by any step of the matching method, the current number of pending requests of each input relative to each of the outputs; and/or a position information indicating position of the respective step within the steps of the matching method.

BRIEF DESCRIPTION OF THE DRAWINGS

Preferred embodiments of the present invention are discussed below in more detail together with the accompanying drawings, wherein:

FIGS. 5a and 5b illustrate the forming of the matching method according to two methods of the prior art;

FIG. 5c illustrates the forming of the matching method according the present invention;

FIG. 5d is an explanatory illustration of the symbols and conventions used in FIGS. 5a, 5b and 5c.

DESCRIPTION OF PREFERRED EMBODIMENTS

Figure 1:
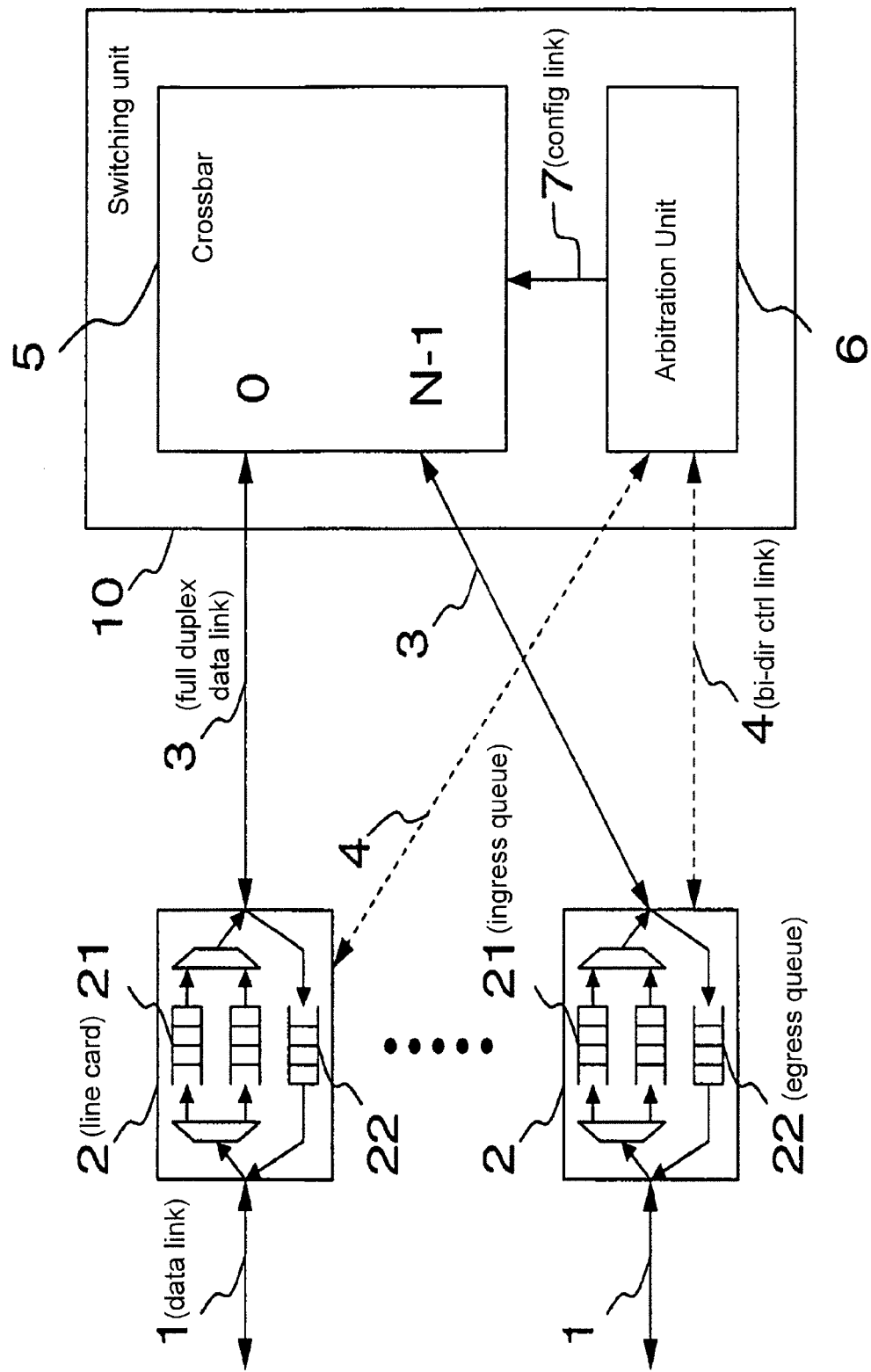
FIG. 1 shows a schematic diagram of a packet switching device comprising an allocation device according to one embodiment of the present invention.

In FIG. 1 a schematic block diagram of a packet switching device is depicted. The packet switching device comprises N bidirectional full-duplex ingress/egress data links 1 that are connected to N line cards 2. Data packets to be transmitted comprise a payload and header information indicating the requested packet destination and are transmitted and received over the data links 1. Each of the line cards 2 provides one or more data inputs and one or more data outputs and is connected to a switching unit 10 via a bidirectional full-duplex data link 3. The switching unit 10 comprises a routing fabric 5 and an arbitration unit 6. The routing fabric 5, typically a crossbar, comprises N input and N output ports. It can also be possible to provide crossbars having a different number of inputs and outputs.

Each line card 2 is also connected to the arbitration unit 6 with a dedicated bidirectional control link 4, which is used to exchange control messages between the line cards 2 and the arbitration unit 6. The arbitration unit 6 is connected to the crossbar 5 through a configuration link 7.

Each of the line cards 2 comprises a plurality of ingress queues 21 for buffering incoming data packets and an egress queue 22 for buffering outgoing data packets. The ingress queues 21 are designed as virtual output queues (VOQ), each dedicated to a specific output, wherein every ingress queue 21 stores data packets destined to the one specific assigned output port.

The crossbar 5 of the switching unit 10 is designed such that at any time an input can only be connected to one output and vice versa, i.e., there is a one-to-one matching between inputs and outputs. To obtain a good performance of-the packet switching device in terms of latency and throughput, this matching is typically computed by the arbitration unit 6. The arbitration unit 6 receives requests from the line cards 2 where a request comprises an output port identifier meaning that the line card 2 that originated the request wishes to transmit a data packet to the output port identified by the output port identifier.

Based on the requests received from all line cards 2, the arbitration unit 6 computes a suitable one-to-one matching between input and output ports for the current time slot.

Based on the computed matching, the arbitration unit 6 then returns the corresponding grant information to the line cards 2. The grant information comprises an output port identifier meaning that the line card 2 receiving this grant information is allowed to transmit a packet to this specific output port. When a line card 2 receives grant information, it dequeues one packet from the corresponding ingress queue 21 and transmits it on the data link 3 to the crossbar 5. The crossbar 5 routes the incoming packets to the data links 3 according to the configuration determined by the matching computed by the arbitration unit 6 and applied to the crossbar 5 via the configuration link 7.

The arbitration unit 6 implements an algorithm to compute a one-to-one matching between the inputs and the outputs. The optimum solution to this problem is known to be too complex to implement in fast hardware. Therefore, a number of heuristic algorithms have been proposed, e.g. i-SLIP. Many of these heuristic algorithms are iterative, i.e. they repeat a given set of steps for a number of times. Each step improves the matching obtained in the previous step until either no additional improvement is found or a predetermined number of steps have been executed. However, existing matches cannot be undone in subsequent steps.

As the packet size is typically fixed, the system is operated in a time-slotted fashion defining time slots, each time slot being equal to the duration of one packet. For maximum efficiency, the arbitration unit should provide one matching in every time slot. Therefore, the amount of time available to compute a matching is given by a minimum packet duration $T_c$. The limits of the physical implementation determine how fast a single iteration of the matching algorithm can be executed; this time is denoted by $T_i$. The number of iterations is typically fixed to a given number M. The time required for one matching then equals $T_M = M*T_i$.

Figure 2:
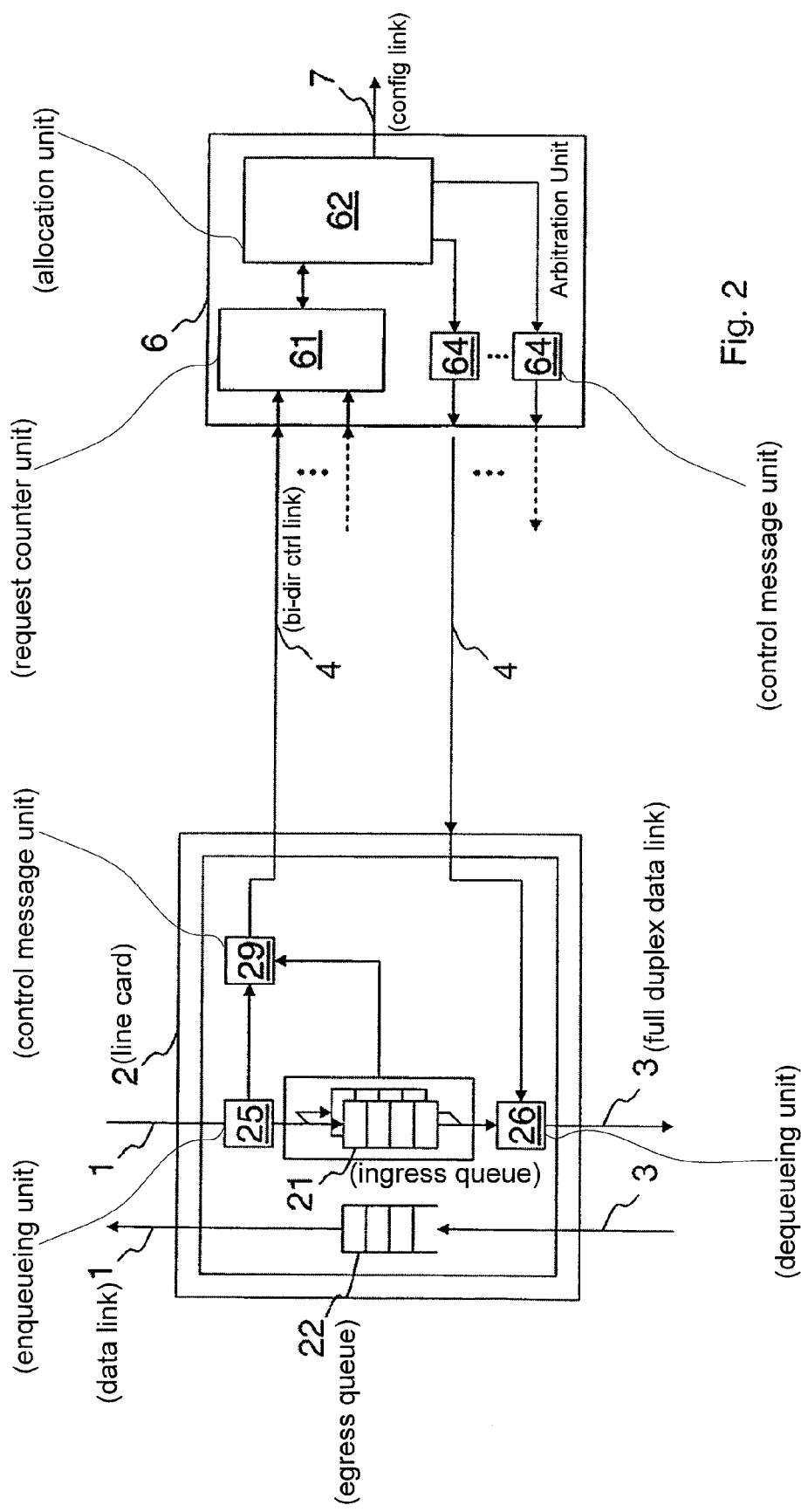
FIG. 2 shows a part of the packet switching device of FIG. 1, depicting the control between one input/output line card and the arbitration unit.

In FIG. 2, the architecture of the arbitration unit 6 and the line cards 2 is depicted more detailed. The arbitration unit 6 is connected via the control links 4 with each of the line cards 2.

The line cards 2 comprise the ingress queues 21 to store incoming data packets and egress queues 22 to store outgoing data packets. Incoming data packets are received by an enqueueing unit 25, which assigns an incoming data packet to the respective ingress queue 21, depending onto which output the incoming data packet should be delivered. The queue occupancy information is provided to a control message unit 29, which is connected to the control link 4. The control message unit 29 generates control messages comprising requests to be transmitted to the arbitration unit 6, indicating the status of the ingress queues 21 wherein the information about the outputs the data packets in the ingress queues 21 are pending for is included. The line card 2 also comprises a dequeueing unit 26 which receives a control message comprising a grant information transmitted via the control link 4, indicating within each time slot which of the ingress queues 21 is allowed to transmit a data packet to the respective output.

The arbitration unit 6 receives control messages comprising the request information and generates the control messages comprising the grant information while setting the crossbar 5 so that the waiting data packet selected by the grant information is transmitted via the crossbar to the respective line card to output the data packet.

The arbitration unit 6 comprises a request counter unit 61 wherein the pending requests generated by all of the connected line cards 2 are collected and buffered. The request counter unit 61 generates request information which is transmitted to an allocation unit 62 which performs a matching method to optimize the matching between the inputs and the outputs of the packet switching device. As a result of the matching method, the allocation unit 62 controls the crossbar 5 via the configuration link 7 and provides a respective grant information to the dequeueing unit 26 for each of the connected line cards 2.

The grant information signals to the respective line card 2 the data packet of which queue is to be transmitted next via the crossbar 5 to the respective output. The generation of the configuration signals via the configuration link 7 to the crossbar 5 and the generation of the grant information and transmitting it to the respective line cards 2 is designed such that the selected data packet from the line card 2 arrives at the crossbar 5 when the crossbar 5 is switched so that the data packet can be forwarded to the respective output.

Figure 3:
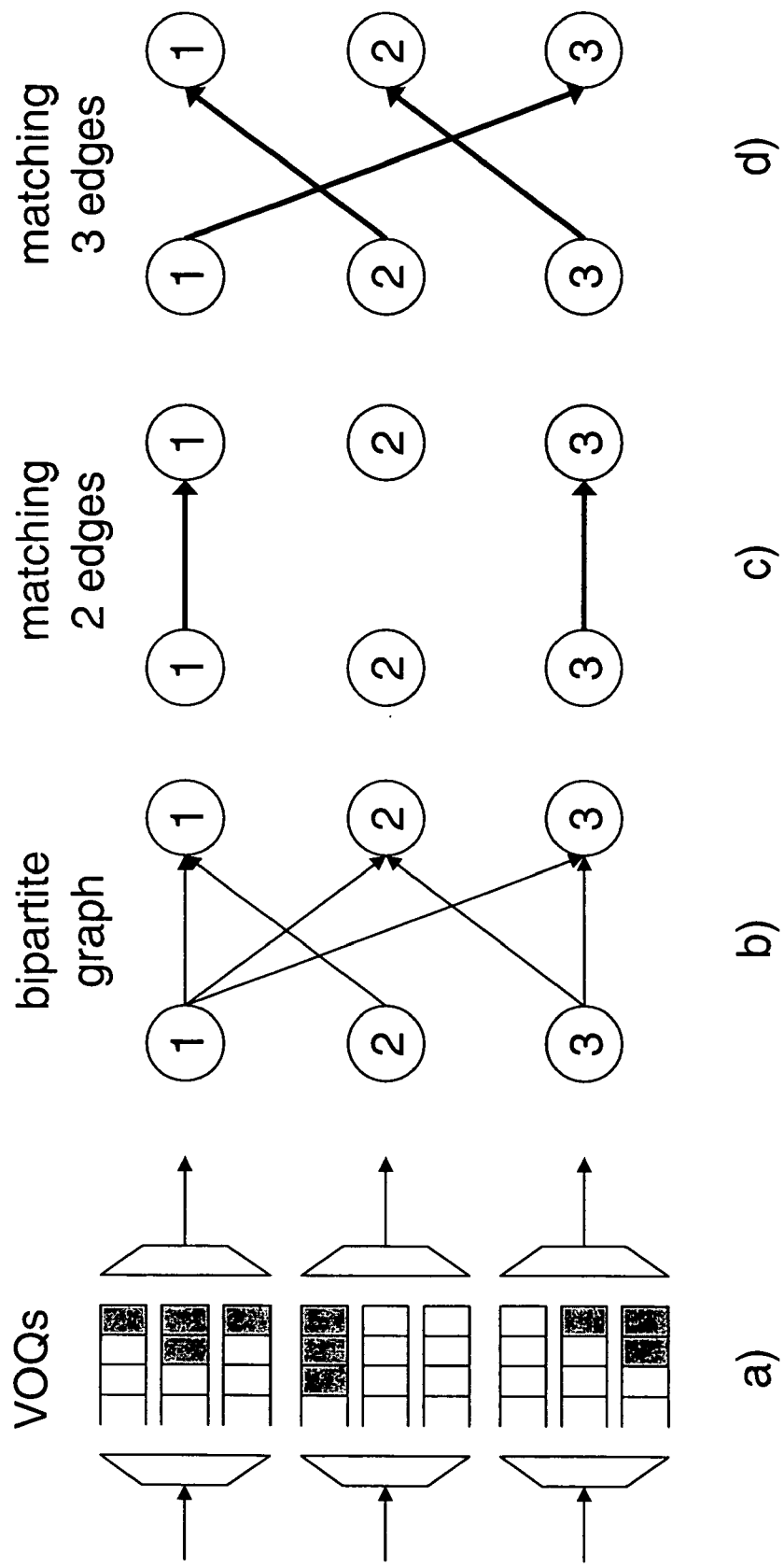
FIG. 3 illustrates the matching problem in allocation devices employed in packet switching devices with several inputs and several outputs.

In the FIGS. 3a)-d) and 4a) and b), a matching problem is discussed existing in the configuration of a packet switching device having a number of inputs and a number of outputs wherein a set of one-to-one interconnections between a set of inputs and a set of outputs should be established to forward data packets through the packet switching device.

In FIG. 3a the ingress queues 21 of three line cards 2 each having one input and one output are depicted schematically. Each of the line cards 2 comprises three ingress queues, one for each possible output of the exemplary allocation device.

The filled boxes of the ingress queues 21 represent data packets waiting to be forwarded to an output associated with the respective ingress queue. In the ingress queues 21 of the upper first line card 2, a data packet in the first ingress queue has to be transmitted to the first output, two data packets in the second ingress queue 21 have to be transmitted to a second output, and one data packet in the third ingress queue has to be transmitted to a third output. In the ingress queues 21 of the second line card 2 three data packets in the first ingress queue have to be transmitted to the first output, in the third line card 2 one data packet in the second ingress queue has to be transmitted to the second output, and two data packets in the third ingress queue have to be transmitted to the third output.

Given the filling state of the ingress queues 21, a bipartite graph, as shown in FIG. 3b can be depicted indicating all of the requesting data links between input and outputs. The matching method now tries to optimise the configuration of the one-to-one interconnections so that as many data packets as possible can be forwarded to the respective outputs at each time slot.

As it is shown in FIG. 3c, the optimisation problem really exists as there is also a non-optimum solution in which only the matching of two inputs to two outputs exists while one of the inputs and one of the outputs can not be used in this time slot. The matching given in FIG. 3d connects the three inputs to the three outputs representing the optimized matching and which should be achieved by the matching method iteratively performed.

Figure 4:
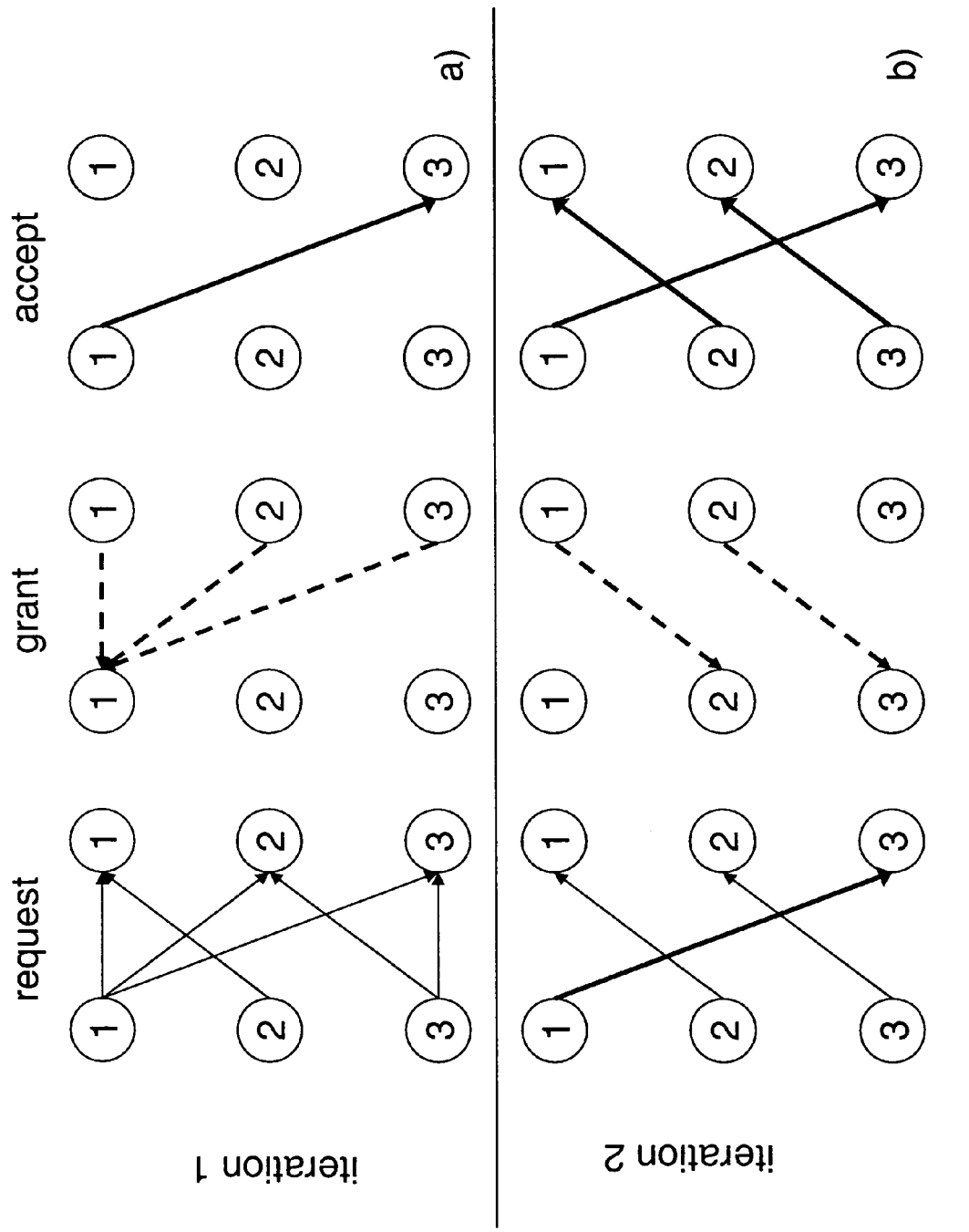
FIG. 4 illustrates the iterative steps to come to an optimized matching between the inputs and the outputs.

The matching method is normally performed in a number of steps iterating the matching solution. This is depicted in FIGS. 4a and b for the case of an iterative 3-phase matching algorithm such as i-SLIP, wherein, beginning with the bipartite graph shown in FIG. 3b which is represented by the request information stored in the request counter unit 61, one interconnection between one input and one output is selected which in the given example is an interconnection between the first input and the third output. As the matching result of the first iteration is fixed in a second iteration step, only a limited number of matching possibilities exist. According to the request information provided by the request counter 61, a matching is possible wherein the second input is connected to the first output and the third input is connected to the second output. Therefore these interconnections will be added to the matching solution in the second iteration.

The number of iterations required is generally given by $\log_2(N)$, however, the matching result may be optimised by a smaller number of iterations.

In FIGS. 5a, 5b and 5c, the timing diagrams of three matching schemes are depicted and compared based on a sequence of four requests $r_{S0}$, $r_{S1}$, $r_{S2}$, $r_{S3}$, received at successive time slots S0, S1, S2 and S3. All three figures use the representation convention and symbols as illustrated in the legend of FIG. 5d, i.e.:
the x-axis indicates time slots from S0 to S7,
the y-axis indicates allocation unit identifiers k, where k=1 to 4,
the grey boxes represent the boundary request and grant conditions of four allocation units 1 to 4 at successive time slots S0 to S7 wherein,
the ingress left arrows indicate pending requests $r_{S0}$ to $r_{S3}$ received at time slots S0 to S3,
the egress bottom arrows indicate matching grants $g_{S1}$ to $g_{S7}$ generated at time slots S1 to S7.

The time to complete one matching iteration is denoted by $T_i$, the required number of iterations per arbitration by M, and the time slot by $T_c$. The arbitration time $T_M$ is then $T_M=M*T_i$. If $T_M>T_c$, paralleling, load balancing or pipelining is used to maintain efficiency. In the example shown here, $T_c/T_i=2$ and M=8.

In FIG. 5a, the matching is performed by parallel allocation units which are independent of each other. To obtain one arbitration decision at every time slot, K=4 identical parallel units are employed, where $K=T_M/T_c$. However, the cell latency in the absence of contention—the absolute minimum latency—in this scheme is equal to $K*T_c$, because the allocation unit waits for all iterations to complete before returning a matching, even if this matching was produced in the first iteration.

In FIG. 5b, the matching is performed by K=4 pipelined allocation units where $K=M*T_i/T_c$ and where each unit executes $I=T_c/T_i$ iterations before passing its matching result (denoted as grants in the figure) on to the next unit of the pipeline. This pipelining scheme incurs the same cell latency penalty of $K*T_c$ as the parallel scheme, because the final matching cannot be delivered before all iterations are executed in sequence, even if this matching was produced in the first iteration.

In FIG. 5c, the matching method according to the present invention is depicted. The presented method also comprises K=4 pipelined allocation units where a matching result is sequentially passed on to the next pipelined unit. However, here the scheme provides a parallel distribution of the requests to all the allocation units, which enables any of these units to shortcut the normal sequence of pipelined iterations and reduces the absolute minimum latency down to a single time slot ($T_c$). The presented matching method as indicated in FIG. 5c produces a final matching $g_{S1}$ in time slot S1 in response to the request $r_{S0}$ received at time slot S0. Thus the latency is reduced to a single time slot ($T_c$). This latency is to be compared with both the parallel scheme of FIG. 5a and the pipelined scheme of FIG. 5b where the final matching $g_{S4}$ produced in response to the received request $r_{S0}$ occurs at time slot S4.

Figure 6:
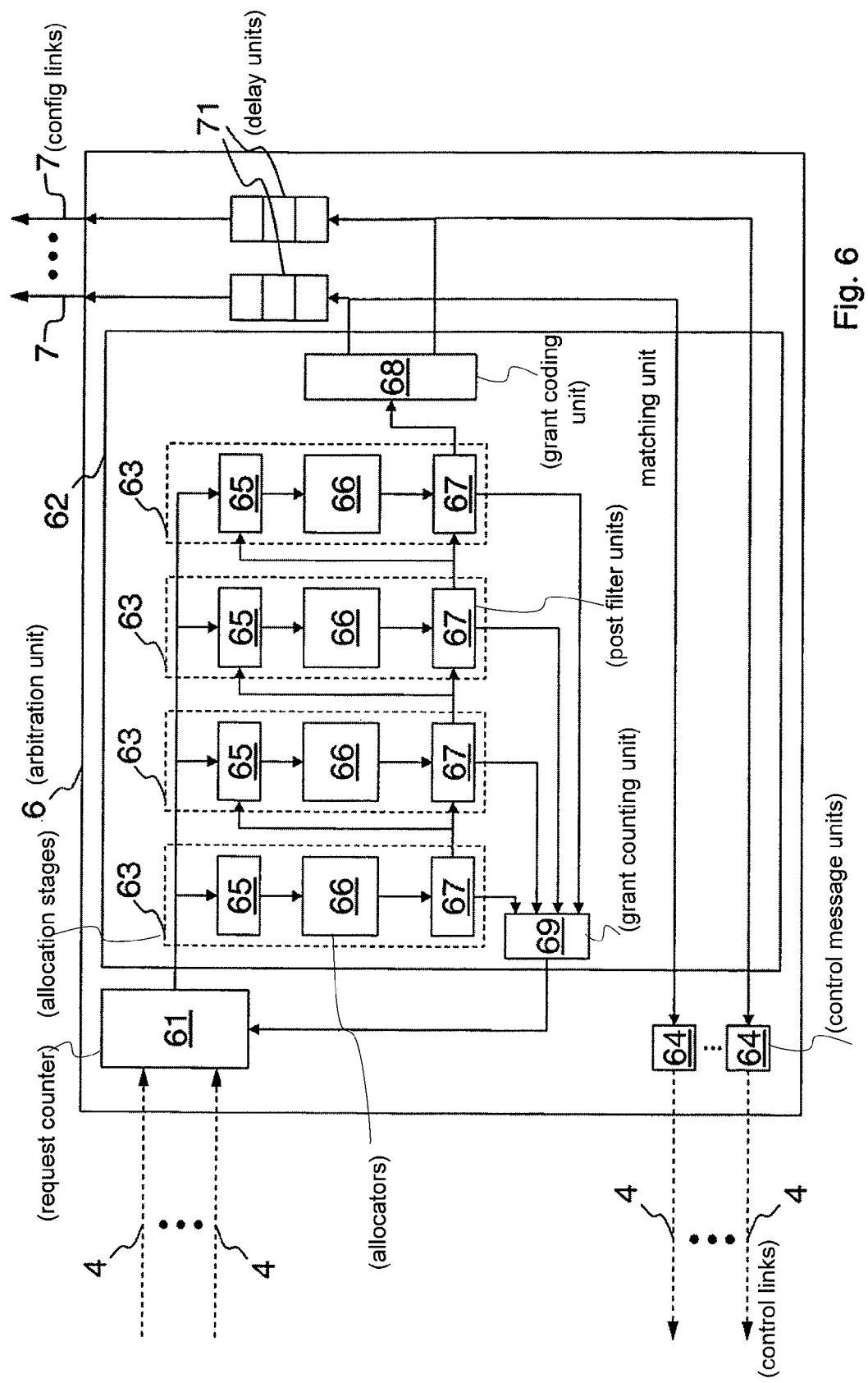
FIG. 6 illustrates a schematic diagram of a preferred embodiment of an arbitration unit in a packet switching device according to a preferred embodiment of the present invention.

In FIG. 6, a more detailed schematic diagram of the arbitration unit 6 is depicted. Particularly, the allocation unit 62 is shown in more detail illustrating the method for allocating pending requests for the transmission of data packets according to an embodiment of the present invention.

The matching unit 62 comprises a number of allocation stages 63 each having an allocator 66, wherein the number of the allocation stages 63 is equal or greater than the next integer equal or greater than the arbitration time $T_M$ divided by the time slot time $T_c$. The allocators 66 provide a matching function for optimizing the performance of the matching.

In each of the allocation stages 63, a prefilter unit 65 is provided including a number of prefilter means (not shown in detail) specifically one for every ingress queue. The output of each of the allocators 66 is connected to a postfilter unit 67 each including a number of postfilter means (not shown in detail) specifically one for every ingress queue.

The allocation stages 63 are connected in series so that an output of the postfilter units 67 associated with one allocator 66 is connected to an input of the postfilter unit 67 and/or an input of the prefilter unit 65 of the successive allocation stage 63. The output of the postfilter unit 67 of the last allocator 66 of the series is connected to a grant coding unit 68 which generates grant information supplied to the control message units 64 and supplied to the crossbar 5 via the configuration links 7. In the configuration links 7 delay units 71 are provided which synchronize the switching in the crossbar 5 and the forwarding of the respective data packets to the determined outputs.

When the requests arrive via the control links 4, the request counter unit 61 decodes the requests and updates the status information of the corresponding ingress queues 21. The request counter unit 61 comprises a plurality of single counters, specifically one for every ingress queue 21 for each of the connected line cards 2. The request counter unit 61 generates request information in every time slot.

When a new request for a specific ingress queue 21 arrives, the corresponding counter is incremented. Each of the postfilter units 67 is connected to a grant collecting unit 69 which counts the new grants for a specific ingress queue 21. When a new matching is obtained for a specific ingress queue 21, the corresponding counter is decremented according to the grant counting unit 69. In this manner, the request counter unit 61 represents the number of pending requests for the corresponding ingress queues 21 of each of the line cards 2. The request information generated by the request counter 61 is sent to any of the prefilter units 65 of each of the allocation stages. Every prefilter unit 65 can forward the request information to the respective allocator 66 of the respective allocation stage or can modify the request information according to rules stated below. The decision whether to modify the request information before forwarding it to the corresponding allocator 66 is based on a predetermined rule.

In a preferred embodiment, this decision is based on the current matching of the corresponding allocator 66, the value of the corresponding counter 61 and/or the position of the allocation stage 63 in the series.

Every allocator 66 receives request information for zero, one or more of the ingress queues 21. It computes a matching according to some matching algorithm which is known from prior art and will not be discussed further herein. The matching method can be iterative and optimizes the configuration of the one-to-one interconnections between the inputs and the outputs of the packet switching device. If an iterative matching method is employed, each allocator 66 is designed to perform one or more iterations on the given request information to forward an intermediate matching result to the corresponding postfilter unit 67 even if this intermediate matching result has not led to the final optimized solution. However, the scope of the present invention is not limited to iterative matching methods.

After each time slot, each of the allocators 66 of every allocation stage 63 outputs the respective partial matching result to the corresponding postfilter unit 67. Every postfilter unit 67 decides whether to modify the received partial matching. In a preferred embodiment, this decision of the filtering units is based on the matching of any allocation stage 63, the newly added matchings of the corresponding allocator 66 or other allocators 66, the status of the request counter 61 and/or the position of the allocation stage 63 in the series.

The postfilter unit 67 merges the filtered partial information with the first or intermediate matching information received from the preceding allocation stage 63 and forwards the merged matching information to the next allocation stage 63 in the pipeline.

The request counter unit 61 stores information on the pending requests that means all requests which are not matched yet. As in all of the allocation stages 63 the generated input-output pairing given by the matching information cannot be removed by successive allocation stages 63 this input-output-pairing related to a pending data packet at the respective input decreases the number of pending requests for the respective input-output-pair by one. As in all of the allocation stages 63 the matching is performed simultaneously and provided at the outputs of the allocators 66 the matching information is collected in a grant counting unit 69 which is connected with an output of each of the postfilter units 67 and to the request counting unit 61 to control the request counting unit 61 to decrease the number of the pending requests by the number of newly added matchings per input-output-pair in the respective time slot.

One main function of the post-filter units 67 is to optimize the performance, particularly in order to prevent too many grants from being issued.

The grant coding unit 68 receives the matching result in the form of a matrix indicating the input-output pairing which is selected by the matching algorithm and generates the control message to compress the matching information to a smaller control message format.

Figures 7, 8:
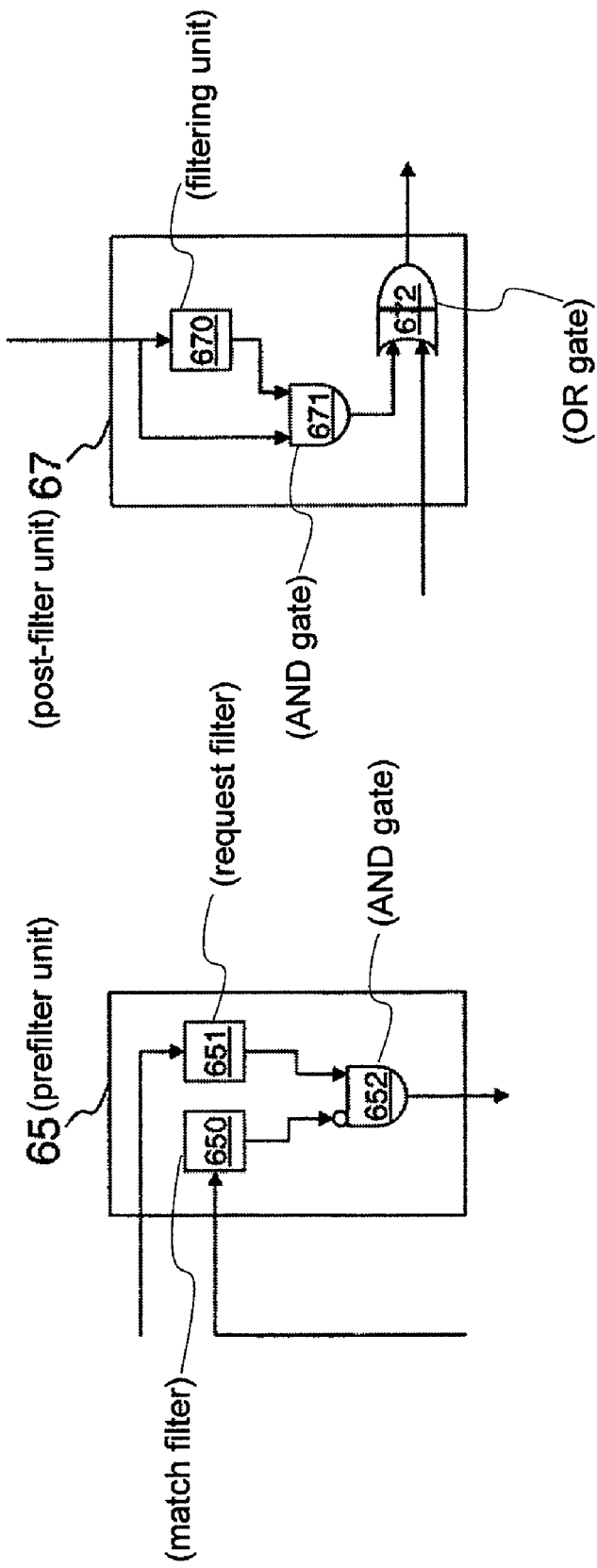
FIG. 7 illustrates a more detailed diagram of a prefilter unit as shown in the embodiment of FIG. 6.
FIG. 8 illustrates a more detailed diagram of a postfilter unit as shown in the embodiment of FIG. 6.

In FIG. 7, a more detailed diagram of one exemplary prefilter unit 65 is depicted. The prefilter unit 65 comprises a match filter 650 to filter out requests for inputs and outputs that have already been matched given by the matching information of the previous allocation stage 63. It further comprises a request filter 651 to implement a request filter function deciding whether the request information is to be applied into the respective allocation stage 63 or not. The request filter 651 can be used to optimize the performance of the arbitration unit 6 by controlling the flow of the request information output by the request counting unit 61. The request filter 651 is optional.

The prefilter unit 65 further comprises an AND gate 652 an output of which is connected to the allocator 66. The output of the match filter 650 is connected to an inverted input of the AND gate 652. Another input of the AND gate 652 is connected with one output of the request filter 651. The resulting output of the AND gate 652 indicates if a request sent by the request counting unit 61 should be considered in the allocator 66 of respective allocation stage 63 or not.

In FIG. 8, a more detailed diagram of one exemplary postfilter unit 67 is depicted. The postfilter unit 67 comprises in the given example a filtering unit 670 performing a post-filtering function depending on the grants and optionally certain other variables. The postfiltering function filters out the one or more grants to be removed. The filtering unit 670 receives as one input the grant information as a result of the associated allocator 66. It is provided in the shown example that one output of the postfiltering unit 670 is false indicating one or more grants to be removed from the result of the respective allocator 66 associated to the post-filter unit 67. The filtering unit 670 is optional and therefore can be omitted in other embodiments.

The postfilter unit 67 further comprises a AND gate 671 at the inputs of which the grant information and the filtering decision is applied to perform the actual filtering. Furthermore, an OR gate 672 is provided having as inputs the filtered grant information received from the output of the second AND gate 671 and the matching result of the previous allocation stage 63 and merges the provided information to the matching information of the current allocation stage 63

The invention claimed is:

1. A method of transmitting packets from devices to output ports, the method comprising:
   providing a plurality of requests to transmit data packets from a plurality of devices, wherein each request corresponds to one of a plurality of input queues of one of the devices and includes an output port identifier for transmitting data packets to one of a plurality of output ports;
   receiving the requests in parallel at respective inputs of a plurality of sequential allocation stages, wherein an output of each stage is connected to an input of a subsequent stage;
   all of the allocation stages performing a matching based on the requests to generate partial matching information, wherein the partial matching information is a matching of less than all the devices to a corresponding one of the output ports;
   transferring, by each of the allocation stages, respective partial matching information to a subsequent allocation stage in the plurality of sequential allocation stages;
   excluding, by a sequential subset of the allocation stages, at least a first sequential allocation stage, and the subset performing a matching based on the requests and the respective partial matching information to generate complete matching information, wherein the complete matching information is a matching of all the devices to a corresponding one of the output ports; and
   granting permission to an input queue of each of the devices for a corresponding one of the output ports using the completed matching information from a last stage of the plurality of sequential allocation stages,
   wherein each matching is based on the same devices and output ports.

2. The method of claim 1, further comprising transferring the partial matching information from a current stage of the plurality of allocation stages to a subsequent stage of the plurality of allocation stages.

3. The method of claim 2, wherein the transferring of the partial matching information from a stage of the plurality to a subsequent stage of the plurality is based on a number of the requests that are pending.

4. The method of claim 2, wherein the transferring of the partial matching information from a current stage of the plurality of allocation stages to a subsequent stage of the plurality of allocation stages is based on a position of the current stage with the plurality of allocation stages.

5. The method of claim 1, further comprising transmitting the data packets from each of the input queues that were granted permission to a corresponding one of the output ports.

6. An arbitration unit comprising:
   a plurality of sequential allocation stages, wherein an output of each stage is connected to an input of a subsequent stage;
   a request unit providing requests to transmit data packets from a plurality of input devices in parallel to an input of each of the stages, wherein each request includes an output port identifier for transmitting data packets to one of a plurality of output ports;
   a grant unit providing final matching information from a last stage of the plurality of allocation stages to the input devices,
   wherein each stage is configured to perform a first matching based on the requests to generate partial matching information during a first period, the first matching based on the same input devices and output ports,
   wherein less than all of the stages are configured to perform a second matching based on the requests and the partial matching information to generate final matching information during a second period, the second matching based on the same input devices and output ports,
   wherein the final matching information is a matching of all the requesting devices to a corresponding one of the output ports.

7. The arbitration unit of claim 6, wherein each of the stages are configured to perform the matching iteratively based on the received requests and the partial matching information from a preceding one of the stages.

8. The arbitration unit of claim 7, wherein at least one of the allocation stages comprises:
   an allocator to perform the matching; and
   a prefilter to perform one of a forwarding of the requests to the allocator or a forwarding of modified information to the allocator, wherein the modified information is based on the requests and the partial matching information from a preceding stage.

9. The arbitration unit of claim 8, wherein prefilter determines whether to forward the modified information based on a current matching in the partial matching information from the preceding stage.

10. The arbitration unit of claim 8, wherein the prefilter determines whether to forward the modified information based on a number of the requests that are pending.

11. The arbitration unit of claim 8, wherein the prefilter determines whether to forward the modified information based on a position of the corresponding allocation stage within the plurality of allocation stages.

12. The arbitration unit of claim 8, wherein at least one of the allocation stages further comprises a postfilter unit for filtering out at least one match in the matching information.

13. The arbitration unit of claim 6, wherein each allocation stage includes an allocation unit to perform the first and second matchings.

14. The arbitration unit of claim 6, wherein the request unit comprises a plurality of counters, wherein each counter corresponds to one of the input ports for counting a number of the requests that are pending for a particular output port.

15. The arbitration unit of claim 6, further comprises a selection unit to selectively provide the requests in parallel to each of the allocation stages.

16. A method of scheduling packet transmissions from input ports of a switching system to output ports of said switching system, the method comprising:
   1) operating in parallel a plurality of allocation stages to compute a plurality of matching informations over the course of a plurality of successive time slots;
      a) one of the matching informations being a final matching information and the others being intermediate matching informations, wherein a final matching information is a matching computed over the course of all the successive time slots and an intermediate matching information is a matching computed over the course of less than all the successive time slots;
   2) performing in each time slot the following steps:
      a) providing a plurality of requests to transmit data packets from a plurality of input ports, wherein each request corresponds to one of the input ports and includes an output port identifier for transmitting data packets to one of a plurality of output ports;
      b) receiving the requests in parallel at respective inputs of the allocation stages, one of the allocation stages generating a final matching information based on a preceding intermediate matching information and the requests received;

c) the other allocation stages each generating a new intermediate matching information based on preceding intermediate matching informations and the requests received; and d) granting permission to the requesting input ports for a corresponding one of the output ports according to the final matching information, wherein the generating of the intermediate matching and the final matching information are based on the same inputs ports and output ports.

17. The method of claim 16, further comprising transferring each intermediate matching information from a current one of the allocation stages to a subsequent stage one of the allocation stages such that the final matching information is obtained from a last stage of the allocation stages in each subsequent time slot.

18. The method of claim 17, further comprising transferring the intermediate matching information from each stage to a subsequent stage.

19. The method of claim 16, further comprising transmitting the data packets from each of the input ports that were granted permission to a corresponding one of the output ports.

* * * * *